US008532802B1

(12) United States Patent  (10) Patent No.: US 8,532,802 B1
Johnston  (45) Date of Patent: Sep. 10, 2013

(54) GRAPHIC PHASE SHIFTER

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1432 days.

(21) Appl. No.: 12/016,877

(22) Filed: Jan. 18, 2008

(51) Int. Cl.
*G06F 17/00* (2006.01)
*G01R 13/00* (2006.01)
*H04R 5/00* (2006.01)

(52) U.S. Cl.
USPC .................. 700/94; 715/716; 702/72; 381/17

(58) Field of Classification Search
USPC ...................... 381/12, 17, 27, 56–58; 700/94; 702/66–72; 715/716, 727
See application file for complete search history.

(56) References Cited

U.S. PATENT DOCUMENTS

| 4,491,701 | A | | 1/1985 | Duttweiler et al. | |
|---|---|---|---|---|---|
| 4,691,358 | A | | 9/1987 | Bradford | |
| 5,671,287 | A | * | 9/1997 | Gerzon | 381/17 |
| 5,812,688 | A | | 9/1998 | Gibson | |
| 6,014,447 | A | | 1/2000 | Kohnen et al. | |
| 6,021,204 | A | | 2/2000 | Eastty | |
| 2004/0254660 | A1 | * | 12/2004 | Seefeldt | 700/94 |
| 2005/0226429 | A1 | | 10/2005 | Hollowbush et al. | |
| 2006/0193478 | A1 | * | 8/2006 | Setoguchi | 381/61 |
| 2007/0110258 | A1 | * | 5/2007 | Kimijima | 381/97 |
| 2007/0287490 | A1 | * | 12/2007 | Green et al. | 455/523 |
| 2008/0089531 | A1 | * | 4/2008 | Koga et al. | 381/92 |
| 2008/0262834 | A1 | * | 10/2008 | Obata et al. | 704/200 |
| 2009/0018828 | A1 | * | 1/2009 | Nakadai et al. | 704/234 |

OTHER PUBLICATIONS

Gerzon, Michael et al., "PS22 Plug-In Manual", 1996, Waves Audio Ltd., pp. 1-15.*
Adobe Systems, "Adobe Announces Audition 3", Sep. 6, 2007, Adobe Systems, all pages.*
Free Audio Analyzer Gains Pro Tools Support, More, http://web.archive.org/web/20031219065625/http://news.harmony-central.com/Newp/2003/Inspector-12.html (archived by WayBack Machine Dec. 19, 2003) (retrieved Sep. 14, 2008) ("Harmony Central").
Adobe Systems Incorporated, "Adobe® Audition® 3 User Guide" published on or after Sep. 6, 2007 (294 pages).

* cited by examiner

*Primary Examiner* — Jesse Elbin
(74) *Attorney, Agent, or Firm* — Schwegman, Lundberg & Woessner, P.A.

(57) ABSTRACT

Systems and methods for editing digital audio data are provided. In one implementation, a method is provided that includes receiving digital audio data. The computer implemented method includes receiving digital audio data and displaying a representation of the digital audio data. The method also includes receiving a selection including a portion of the digital audio data, analyzing a feature of the audio data for the selected portion with respect to a plurality of frequency bands in the digital audio data, calculating a feature value for each frequency band over a specified period of time, and using the feature value for each frequency band to adjust the feature of the audio data.

36 Claims, 9 Drawing Sheets

GRAPHIC PHASE SHIFTER

BACKGROUND

The present disclosure relates to editing digital audio data.

Different visual representations of audio data are commonly used to display different features of the audio data. For example, an amplitude display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

Audio data can be edited. For example, the audio data may include noise or other unwanted components. Removing these unwanted components improves audio quality (i.e., the removal of noise components provides a clearer audio signal). Alternatively, a user may apply different processing operations to portions of the audio data to generate particular audio effects.

Phase noise is the frequency domain representation of rapid, short-term, random fluctuations in the phase of a wave, caused by time domain instabilities (e.g., jitter). The phase of an oscillation or wave is the fraction of a complete cycle corresponding to an offset in the displacement from a specified reference point at time t=0. An oscillator, for example, can generate a series of waves which can simulate rhythms, patterns, and repetition in nature. Two oscillators that have the same frequency and different phases have a phase difference, and the oscillators are said to be out of phase with each other. It is common for acoustic (sound) waves to become superimposed in their transmission medium such that the phase difference determines whether the acoustic waves reinforce or weaken each other, (e.g., causing phase noise). Additionally, complete cancellation is possible for waves with equal amplitudes. Thus, editing operations to adjust phase differences can be performed to reduce or eliminate phase noise or signal (e.g., wave) cancellation.

An audio channel is a means for delivering audio data (e.g., audio signals) from one point to another. Audio data (e.g., an audio waveform) submitted to the channel input results in a similar waveform at the channel output. Panning is the spread of a monaural (e.g., single channel) signal in a stereo or multi-channel sound field. An audio pan control can be used in a mix to create the impression that audio data is moving from one channel to the other. For example, when audio data is directed to different channels located in different places, panning the audio data from one channel to another can create the impression that the audio data is moving from a first place to a second different place.

Panning can also be used in an audio mixer to reduce (e.g., to 0%), or enhance (e.g., beyond 100%), a stereo field of a stereo signal. For instance, the left and right channels of a stereo source can be panned straight-up (e.g., sent equally to both the left output and the right output of the mixer), creating a dual mono signal.

SUMMARY

In general, in one aspect, a method is provided. The computer-implemented method includes receiving digital audio data and displaying a representation of the digital audio data. The method also includes receiving a selection including a portion of the digital audio data, analyzing a feature of the audio data for the selected portion with respect to a plurality of frequency bands in the digital audio data, calculating a feature value for each frequency band over a specified period of time, and using the feature value for each frequency band to adjust the feature of the audio data.

Embodiments of this aspect can include apparatus, systems, and computer program products.

Implementations of the aspect can include one or more of the following features. The feature can be phase difference or pan position. The aspect can further include generating a representation of the analyzed feature including the calculated feature value for each frequency band over the specified period of time. The representation of the analyzed feature can be applied to the audio data where applying includes constructing a curve that adjusts the feature value for each frequency band by an amount corresponding to the curve value. The representation of the analyzed feature can be applied to the audio data where applying includes re-applying the representation of the analyzed feature to the digital audio data to adjust audio data outlying the curve after the first adjustment. The representation of the analyzed feature can be applied to the selected portion of audio data, a portion of audio data other than the selected portion, or both.

In general in one aspect, a method is provided. The method includes receiving digital audio data and displaying a representation of the digital audio data. The method also includes receiving a selection including a portion of the digital audio data, analyzing a feature of the audio data for the selected portion with respect to a plurality of frequency bands in the digital audio data, dynamically calculating a feature value as it changes such that the calculation of each feature value is based upon the value of that feature at a previous time period and with respect to a specific frequency band within the selected portion, and using each feature value to adjust the feature of the audio data.

Embodiments of this aspect can include apparatus, systems, and computer program products.

Implementations of the aspect can include one or more of the following features. The feature can be phase difference or pan position. The aspect can further include generating a representation of the analyzed feature including each dynamically calculated feature value for each frequency band. The representation of the analyzed feature can be applied to the audio data where applying includes constructing a curve that automatically adjusts the feature value for each frequency band by an amount corresponding to the curve value, and where the adjustment is done as the representation is being generated. The representation of the analyzed feature can be applied to the audio data where applying includes re-applying the representation of the analyzed feature to the digital audio data to adjust audio data outlying the curve after the first adjustment. The representation of the analyzed feature can be applied to the selected portion of audio data, a portion of audio data other than the selected portion, or both.

In general in one aspect, a computer implemented method is provided. The method includes receiving digital audio data, displaying a representation of the digital audio data, receiving input specifying values for a pan position defined with respect to a plurality of frequency bands in the digital audio data, and applying the specified pan position values to the audio data to form edited audio data.

Embodiments of this aspect can include apparatus, systems, and computer program products.

Implementations of the aspect can include one or more of the following features. The aspect can further include generating a representation of the specified pan position values. The representation of the analyzed feature can be applied to the audio data where applying includes constructing a curve that adjusts the feature value for each frequency band by an amount corresponding to the curve value. The representation of the analyzed feature can be applied to the audio data where applying includes re-applying the representation of the analyzed feature to the digital audio data to adjust audio data outlying the curve after the first adjustment. The representation of the analyzed feature can be applied to the selected portion of audio data, a portion of audio data other than the selected portion, or both.

Particular embodiments of the subject matter described in this specification can be implemented to realize one or more of the following advantages. The system can automatically adjust audio features eliminating the need for inaccurate manual estimates. An audio feature can be adjusted by frequency band in order to provide a finer adjustment of the audio feature at particular points in time. The system can present a graphical representation of the analyzed data to the user. The user can use the graphical representation to manually and more accurately customize the analyzed data before applying the analyzed data to the digital audio data. Application of the analyzed audio data to the underlying digital audio data will create edited digital audio data according to the graphic representation of the analyzed data. Thus, the analyzed audio data can represent a preview of the edits that the user would like to apply to the digital audio data. Manipulating the phase differences for each frequency can be useful for creating spatial "3-Dimensional" effects when listening on limited devices (e.g., laptops or computer speakers). Bringing different channels (e.g. left and right channels) into phase increases a stability of the stereo field when listening and can ensure that the lowest frequencies are in phase.

Additionally, using a graphical user interface, a user can manually define and edit a feature of the audio data (e.g., pan position). The user-defined pan position can represent a preview of the edits (e.g., changes to the pan position), that the user would like to apply to the digital audio data. The user-defined pan position can then be applied to the digital audio data creating edited digital audio data with a more evenly distributed pan position. By analyzing the audio data to get an average spread of the pan position for each frequency, frequencies in the stereo field can be corrected when unwanted pan/frequency biases are introduced by analog equipment and processes (e.g., highs being stronger in one channel from an analog tape recording).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
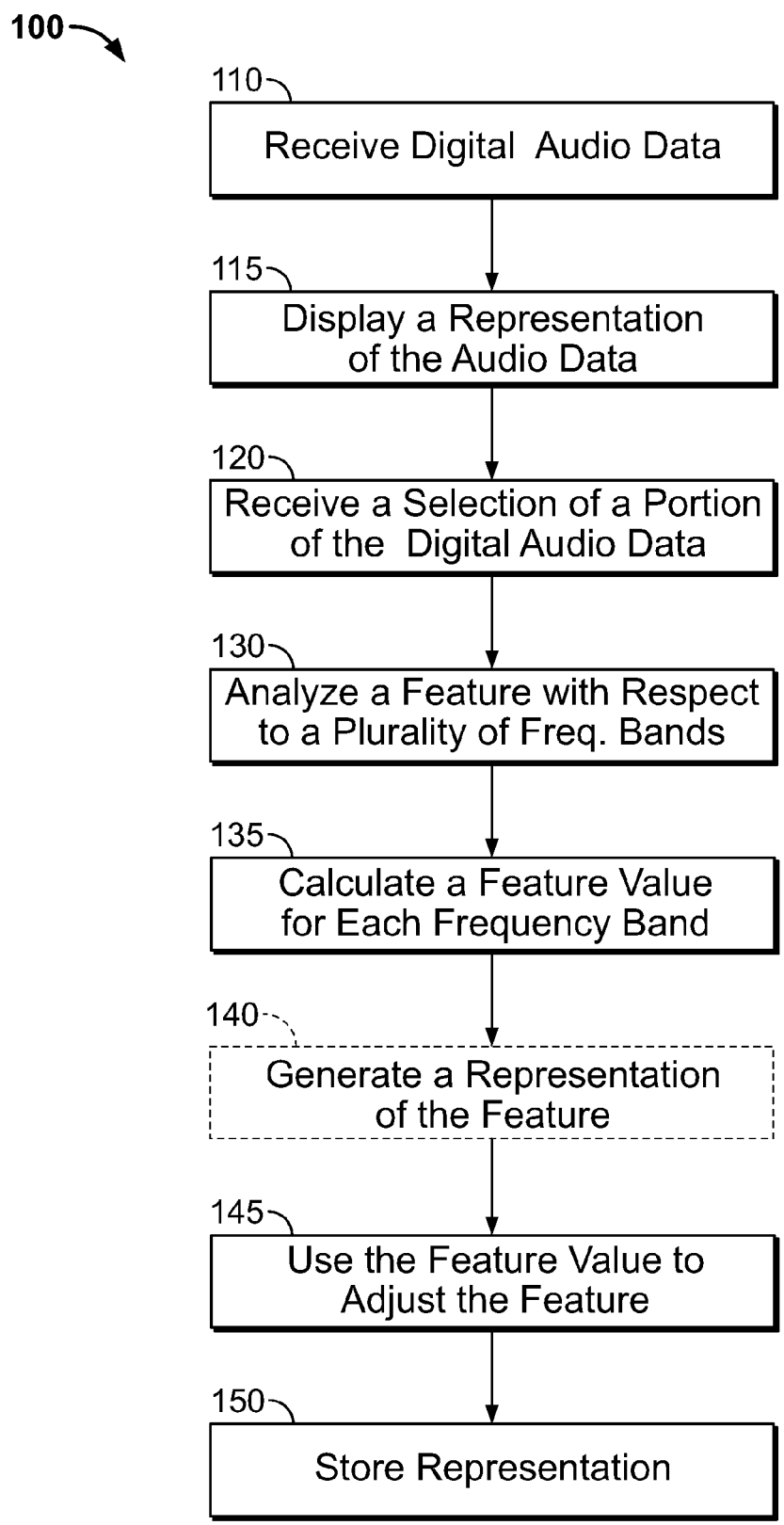
FIG. 1 shows a flowchart of an example method for editing digital audio data.

FIG. 1 shows a flowchart of an example method 100 for editing digital audio data. For convenience, the method 100 will be described with reference to a system that performs the method 100. The system receives 110 digital audio data. Audio data can represent a combination of audio sources that can be treated in combination as a single audio data. For example, the system can receive audio data from multiple sources, combine the audio data into a single source, and store the combined source of audio data on a single editable storage medium (e.g. an audio track). For simplicity, the method 100 will be described with respect to a single track. However, the method 100 can be applied to multi-track audio. For example, the audio data can be initially stored on a single track. Alternatively, the received track can be, for example, a mixdown track that is a combination of multiple tracks.

The audio data is received, for example, as part of an audio file (e.g., a WAV, MP3, or other audio file). The audio file can be locally stored or retrieved from a remote location. The audio data can be received, for example, in response to a user selection of a particular audio file. The audio data can be received in response to a user input to the system selecting particular audio data to edit. The audio data can also be received for other purposes (e.g., for review or playback by the user). In some implementations, the system receives the audio data from a storage device local or remote to the system.

The system can display 115 a representation of the audio data (e.g., as an audio waveform). For example, the system can display a visual representation of a track with respect to a feature of the audio data (e.g., amplitude or frequency), on a feature axis and with respect to time (e.g., in seconds), on a time axis.

Figure 2:
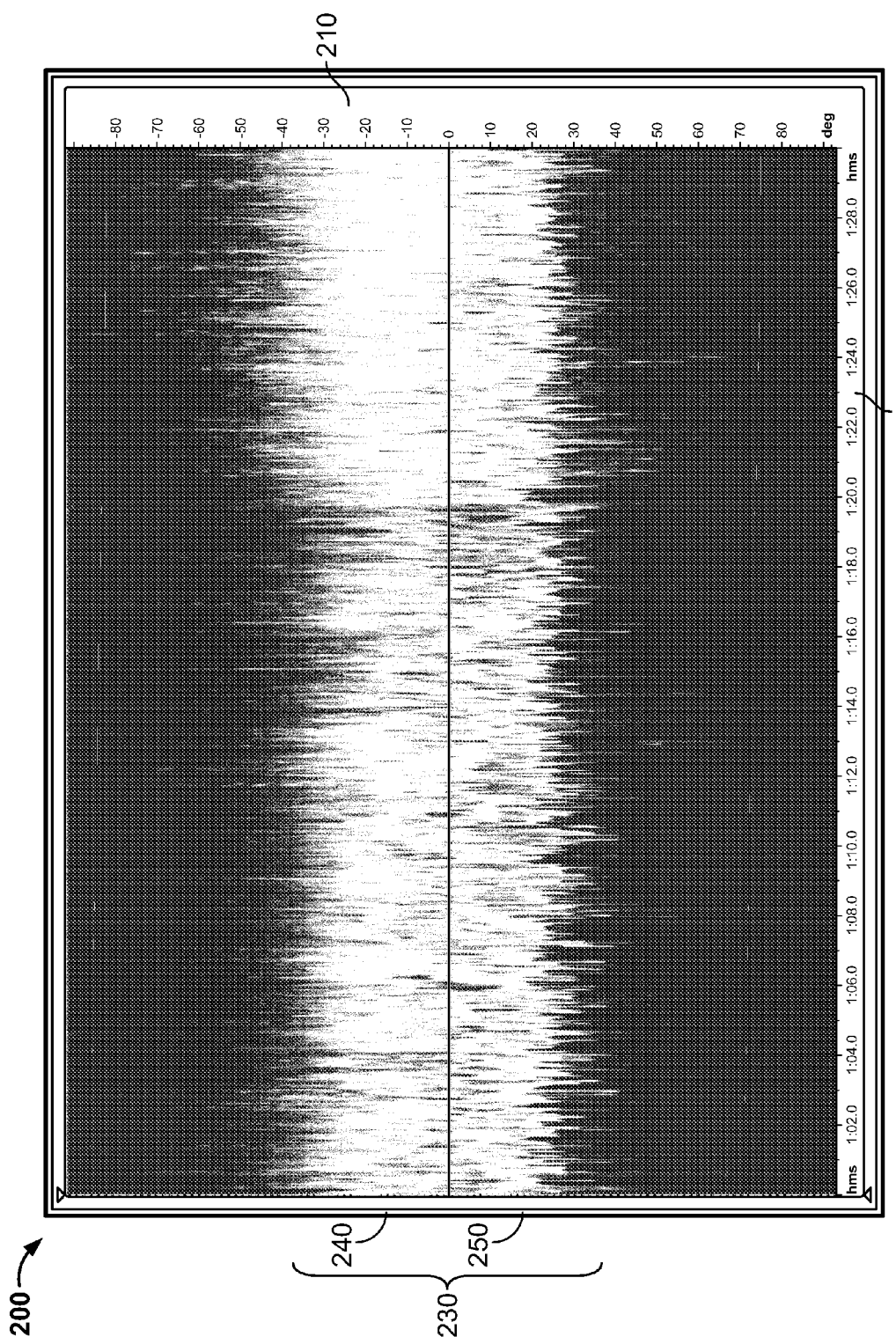
FIG. 2 shows an example phase display of audio data.

FIG. 2 shows an example phase display 200 of audio data. The display 200 includes a visual representation of audio data contained within a track. The display 200 includes a feature axis 210 (e.g., representing phase), and a time axis 220. The audio data can correspond to particular audio sources (e.g., voice, music, or noise). The display 200 shows the audio data represented as a phase diagram 230. However, in other implementations, the audio data can be displayed in various visual representations including an amplitude waveform, pan position, and frequency spectrogram.

The system receives 120 a selection of audio data. In some implementations, the user uses the displayed visual representation of the audio data to select (e.g., by highlighting or otherwise demarcating), some or all of the audio data to edit. For example, the user can select audio data specific to the operation that the user wishes to perform on that audio data. The user can select all audio data in the displayed visual representation. Additionally, the user can select one or more concurrent or contiguous portions of the audio data to edit. In some implementations, the user can select audio data by demarcating a region of the audio data using one or more editing tools (e.g., a rectangle tool used to provide a particular marquee selection in the displayed visual representation).

The system analyzes 130 a feature in the audio data (e.g., phase difference or pan position), with respect to frequency in the selected portion. For example, the audio data of the selected portion can be analyzed with respect to a specified number of frequency bands (e.g., 9,900 frequency bands distributed between 100 Hz and 10 kHz). In some implementations, a Fast Fourier Transform ("FFT") can be performed to get the amplitude and phase information at each frequency band the audio can be reconstructed after manipulating the amplitude or phase data. Thus, the relative phase or pan position can be adjusted by adjusting the amplitude and phase for each channel accordingly. For example, if 100 Hz is panned hard left, the amplitude of the right channel for 100 Hz can be set to zero. In another example, if the 1 kHz band should be adjusted in phase by 90-degrees, we can either add 90-degrees to the phase of a single channel, or −45-degrees to the phase of one channel and +45-degrees to the phase of the other channel, as both of these adjustments result in a 90-degree shift.

In some implementations, the audio data is multi-channel (e.g., greater than 2 channels). When the audio data is multi-channel, the method can be applied to the multi-channel audio data by designating one channel as the reference, and then applying the stereo algorithms to each pair of audio channels. For example, in a 4 channel system, channel 1 can be designated as the reference, and the algorithm can be applied to the stereo pairs (1,2), (1,3), and (1,4), improving phase coherence between the audio channels. In some implementations, the system analyzes the entire audio data (e.g., automatically or by a specified menu selection). In some implementations, the system begins analysis of the audio data at the beginning of the track and stops analysis of the audio data at a specified (e.g., default or user-selected) point in the audio data.

The analysis provides 135 calculated feature values for the analyzed audio data. The calculated feature values (e.g., values of phase with respect to frequency) can be used to apply a correction to the underlying audio data (e.g., an equal but opposite magnitude adjustment of phase at frequency X and time T to center the phase). After the system has analyzed the audio data with respect to the particular feature, the system can optionally generate 140 a representation (e.g., a graphical display), of the analyzed feature. For example, the representation can display the results of the analysis of the audio data with respect to phase (e.g., showing phase as a function of frequency). In some implementations, the system can automatically apply the results of the analysis of the audio data to the underlying audio data such that the system displays an updated visual representation (e.g., the edited phase diagram). Applying the results of the analysis to audio data is described in greater detail with respect to FIG. 4.

Figure 3:
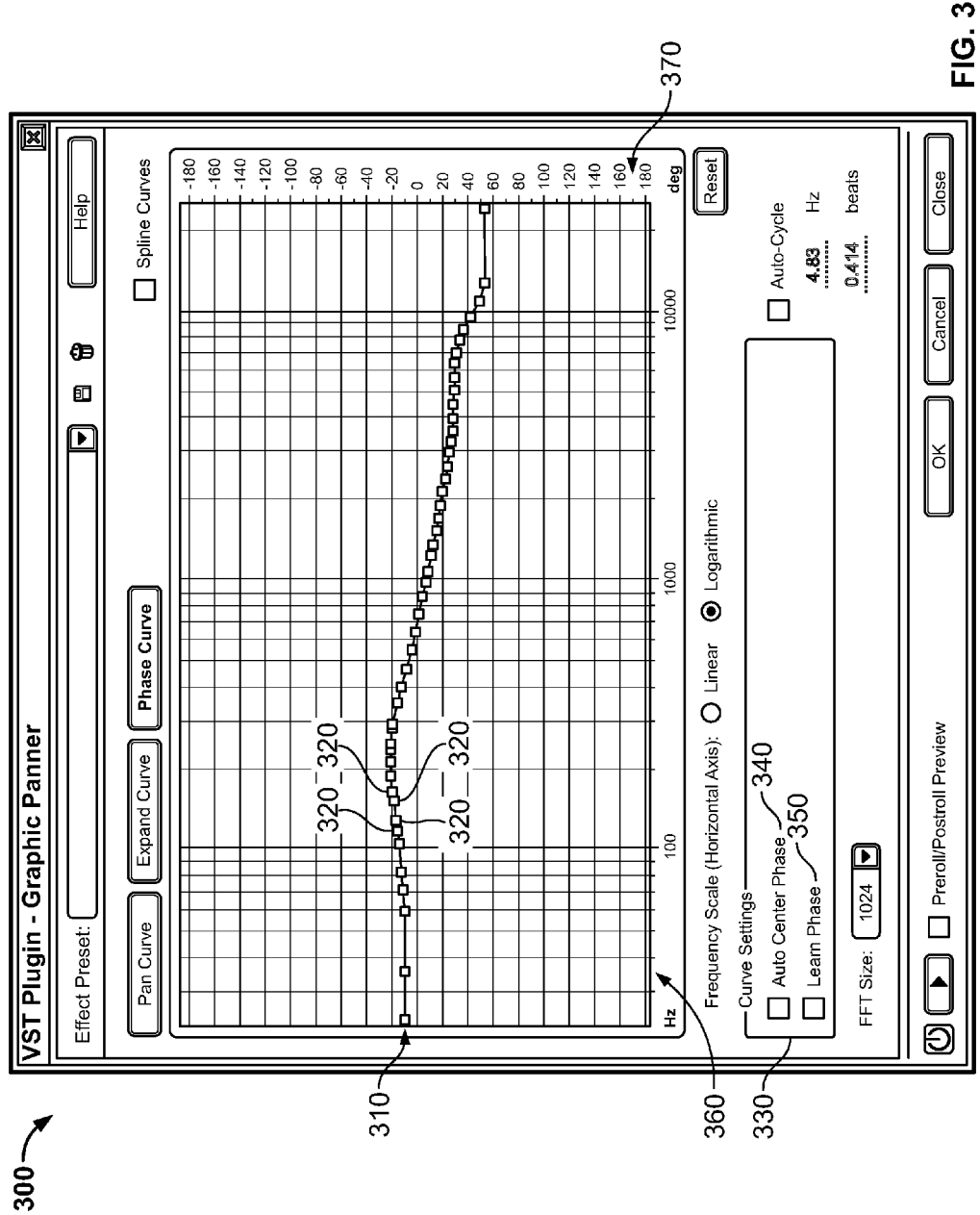
FIG. 3 shows an example user interface for editing audio data.

FIG. 3 shows an example user interface 300 for editing the audio data. The user interface 300 includes a graphical representation of the analyzed audio data 310. The system can display the graphical representation of the analyzed audio data 310 with respect to one or more features of the audio data. For example, user interface 300 shows a representation of the analyzed audio data 310 with respect to frequency on Y-axis 360 and with respect to phase on the X-axis 370. In particular, the graphical representation of the analyzed audio data 310 represents the average phase with respect to specified frequency bands. In some implementations, the system displays a user interface similar to user interface 300 showing a representation of the analyzed audio data with respect to frequency on Y-axis and with respect to pan on the X-axis.

The representation of the analyzed audio data 310 can show how the analyzed feature changes with frequency. For example, the representation of the analyzed audio data 310 shows the phase of the audio data corresponding to lower frequencies (e.g., 100 Hz), to be negative (e.g., −20-degrees). Additionally, the representation of the analyzed audio data 310 shows the phase of the audio data corresponding to higher frequencies (e.g., 10 kHz), to be positive (e.g., 40-degrees).

In some implementations, the representation of the analyzed audio data shows other features of the audio data with respect to frequency. For example, a representation of analyzed audio data according to pan position of the audio data can show pan position corresponding to lower frequencies (e.g., 100 Hz), to be negative (e.g., −80-degrees), and the pan position of the audio data corresponding to higher frequencies (e.g., 10 kHz), to be positive (e.g., 80-degrees). Additionally, when the phase (or pan) settings are applied uniformly to the entire digital audio data, the edited audio data can require additional modifications to finely tune the feature (e.g., phase) of the audio data (e.g., when individual portions of the audio data are out of phase because of the edit).

In addition to displaying the representation of the analyzed audio data 310, the user interface 300 can also include controls that can be used for applying effects or modifications to some (e.g., one or more designated or selected portions) or all of the audio data. For example, the representation of the analyzed audio data 310 can include one or more control points 320 that the user can manipulate to edit the representation of the analyzed audio data and, when applied, the corresponding underlying audio data.

The user interface 300 can also include one or more curve settings 330 (e.g., auto center phase 340 or learn phase 350). The curve settings 330 identify specific techniques for generating the representation (e.g., a curve), of the analyzed feature. For example, if the learn phase 350 curve setting is selected, the representation of the analyzed audio data 310 with respect to a particular feature can be generated by calculating a value (e.g., an average value), of the particular feature at each frequency band over the time period in which the analysis occurs (e.g., in the selected portion of the audio data or in the entire audio data).

For example, during the learn phase technique when the feature is phase difference, the system calculates the average phase difference (e.g., average position in the cycle of two oscillators), for each frequency band over the specified time period. For example, for a particular frequency band of 100-200 Hz and a specified time period of 8 seconds, the system calculates the average phase difference of the audio data occurring between 100 and 200 Hz over the 8 second time period. Similarly, during the learn phase technique when the feature is pan position, the system calculates the average pan position (e.g., the average distribution of the sound between the left-to-right placement of a track), for each frequency band over the time period.

The representation of the analyzed audio data 310 can be displayed as a curve that can be used to edit a feature of the audio data. In some implementations, the system analyzes a selected portion of audio data, calculates an average pan position and then applies the results (e.g., the curve), to other unselected portions of audio data. In some implementations, the audio data includes multiple tracks, and the system (e.g., automatically or by user selection), applies the results of the analyzed portion to one or more of the audio tracks (e.g., to one or more complete audio tracks or to a selected or designated portion of one or more audio tracks).

Figure 4:
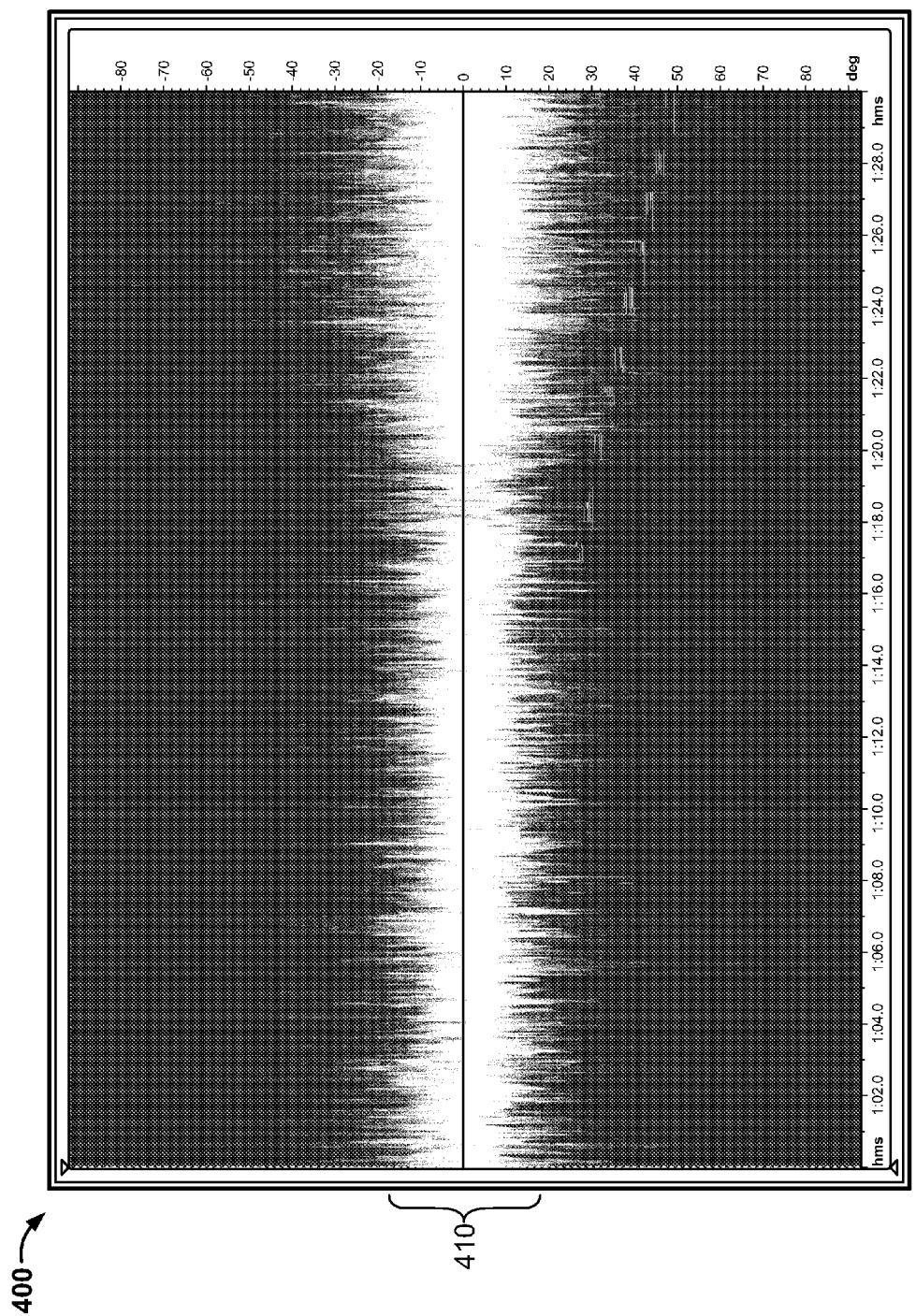
FIG. 4 shows an example phase display of edited audio data.

The system uses 145 calculated feature values tot adjust the features of the audio data. FIG. 4 shows an example phase display 400 of edited audio data 410. The edited audio data 410 shows an updated representation of the audio data following an application of the phase analysis data (e.g., curve data) to the audio data in order to center the phase. After the representation of the analyzed audio data 310 is generated (e.g., as a curve or as a set of data points of some specified granularity), it can be applied to the underlying audio data. The application of the curve to the audio data can adjust 145 the feature value by an amount corresponding to the respective curve value.

For example, the phase diagram 230 in FIG. 2 shows a phase view with frequencies phased higher in one direction 240 (e.g., up to −50-degrees), and lower in the other direction 250 (e.g., up to −25-degrees). In FIG. 3, the average phase difference for each frequency band can be used to center the phase for each frequency band toward zero. For example, if a shift of an amount equal to the amount on the curve (but opposite in direction) is applied to the audio data corresponding to each frequency band, the phase for each frequency band, on average, can be substantially centered to zero. In FIG. 4, the learn phase curve 310 is applied to the phase diagram 230 resulting in an edited phase diagram 410 (e.g., where the audio data is corrected according to frequency to provide overall audio data substantially centered with respect to phase).

In some implementations, the curve 310 is applicable to one or more portions of the audio data one or more times (e.g., to adjust audio data lying outside of the curve after a first application of the curve to the audio data). For example, each time the curve 310 is applied to the same audio data, a new iteration of the edited audio data is created. In some implementations, after the curve 310 is applied to the audio data, a new curve is generated (e.g., a curve based on the edited audio data that is finer tuned or which captures outlying audio data), and applied to the same audio data. In some implementations, the entire curve 310 is applied to the entire audio data. For example, the entire curve 310 can be applied when no smaller portion of audio data is selected (e.g., a portion smaller than the portion representing the curve 310), or when no selection is made indicating a particular portion of the audio data for application of the curve 310 (e.g., the curve already reflects the entire audio data). In some implementations, one or more segments of the curve 310 are individually selected and applied to one or more portions (e.g., selected or pre-determined), of the phase diagram 230 representation of the audio data.

In some implementations, when the auto center phase 350 curve setting is selected in the interface 300, the representation of the analyzed audio data 310 with respect to a particular feature is generated dynamically with respect to time. In particular, the system can dynamically calculate a feature value (e.g., for each of a specified number of frequency bands) as a function of time. For example, the calculation of each feature value can be based upon the average value for that particular feature over a specified prior time period (e.g., an average value occurring at a time period immediately prior to the current time period), and with respect to a specific frequency band within the selected portion of the audio data.

Thus, the average value for a feature over a short time interval (e.g., a few seconds) is used to adjust the feature (e.g., pan or phase) value to a particular set point (e.g., zero). In some implementations, another set point can be used (e.g., to force low frequencies to zero and to adjust high frequencies to the left or to force a 90-degree phase difference). Once the average feature value is calculated, the average feature value can be used to adjust the phase or pan to any amount (e.g., an amount other than zero). To adjust the phase or pan to zero, the pan or phase would need to be shifted by the negative value of the calculated average feature value.

Thus, for a given frequency band, the average value is calculated as a function of the feature value of the frequency band in the prior time period. As the average value is calculated, the system can construct a graphical representation of the average value (e.g., curve 310). Additionally, as the curve 310 is constructed, the system can apply the curve 310 to the audio data 230 creating adjusted audio data 410. Specifically, the system can automatically adjust the feature value for each frequency band by an amount corresponding to the respective curve value. In some implementations, the calculation of each feature value can be based on the average value for that feature from a specified time period or from the beginning of the audio data when no previous time period exists. In some implementations, the system will move from one time period to the next automatically. In some implementations, the user or the system can designate specified time periods within the audio data for analysis. For example, for a second designated time period of 3-6 seconds, the system can use the average feature values for a first designated time period of 1-3 seconds.

After applying a correction to the audio data according to the analysis of the feature values with respect to frequency (e.g., application of the curve 310 to the audio data 230), the system can store 150 the representation of the adjusted audio data 410 for future use or manipulation. The user can choose to store the original audio data 230, the adjusted audio data 410, or both. The system can also store 150 each iteration of the audio data after each re-application of the curve 310 to the audio data. The system can also store 150 any iterations of audio data comprising applications of newly generated curves (e.g., a curve that is finer tuned or which captures outlying audio data not affected by the application of curve 310).

Figure 5:
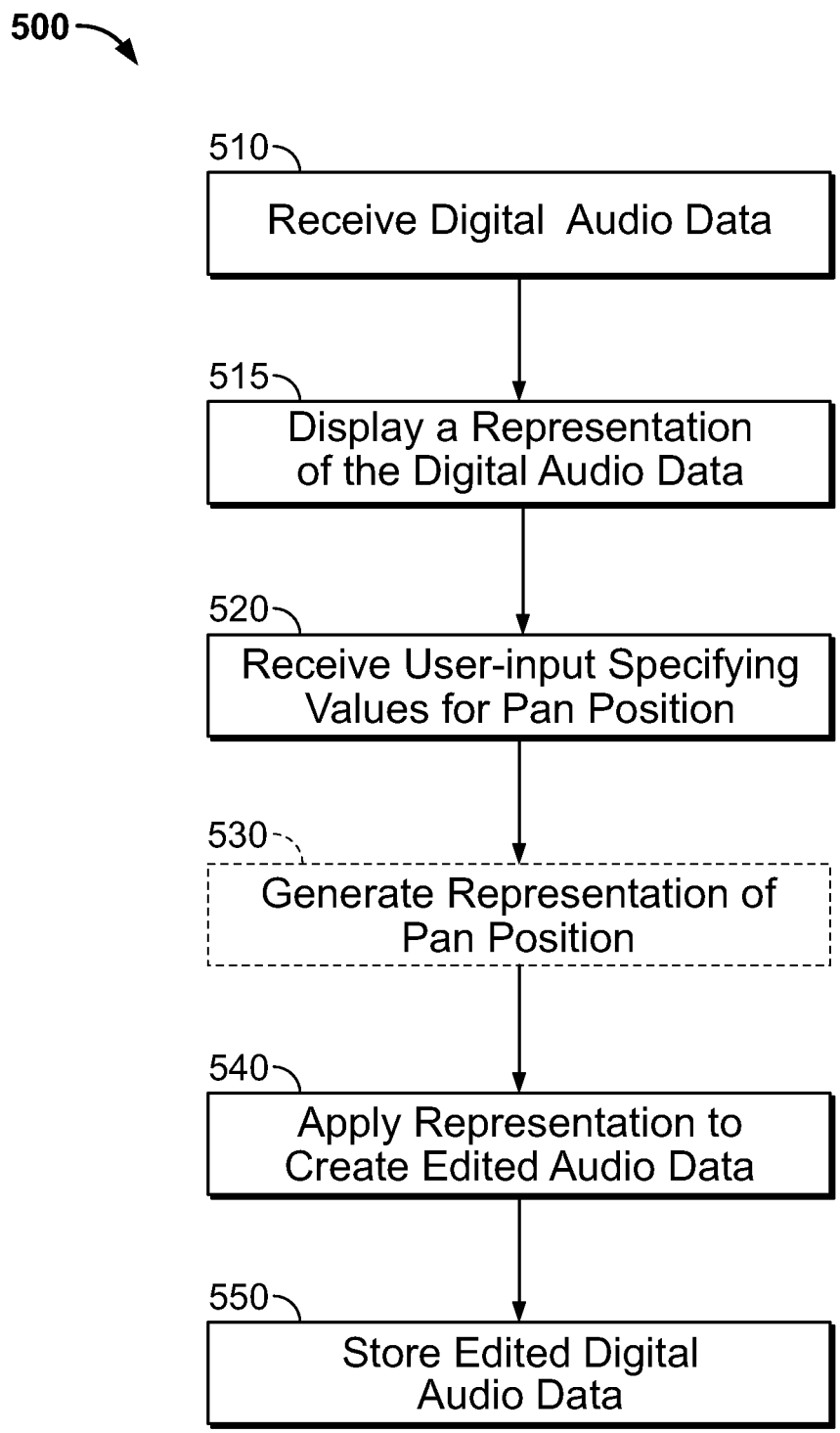
FIG. 5 shows a flowchart of an example method for editing digital audio data according to pan position.

In some implementations, user-specified values for a specific feature (e.g., pan position), are applied to the digital audio data. FIG. 5 shows a flowchart of an example method 500 for editing digital audio data according to pan position. For convenience, the method 500 will be described with reference to a system that performs the method 500.

The system receives 510 the digital audio data. The audio data can be received in response to a user input to the system selecting particular audio data to edit. The audio data can also be received for other purposes (e.g., for review or playback by the user). In some implementations, the system receives the audio data from a storage device local or remote to the system. The system displays 515 a representation of the audio data (e.g., as an audio waveform). For example, the system can display a visual representation of one or more tracks of audio data with respect to a feature of the audio data (e.g., amplitude or frequency), on a feature axis and with respect to time (e.g., in seconds), on a time axis.

Figure 6:
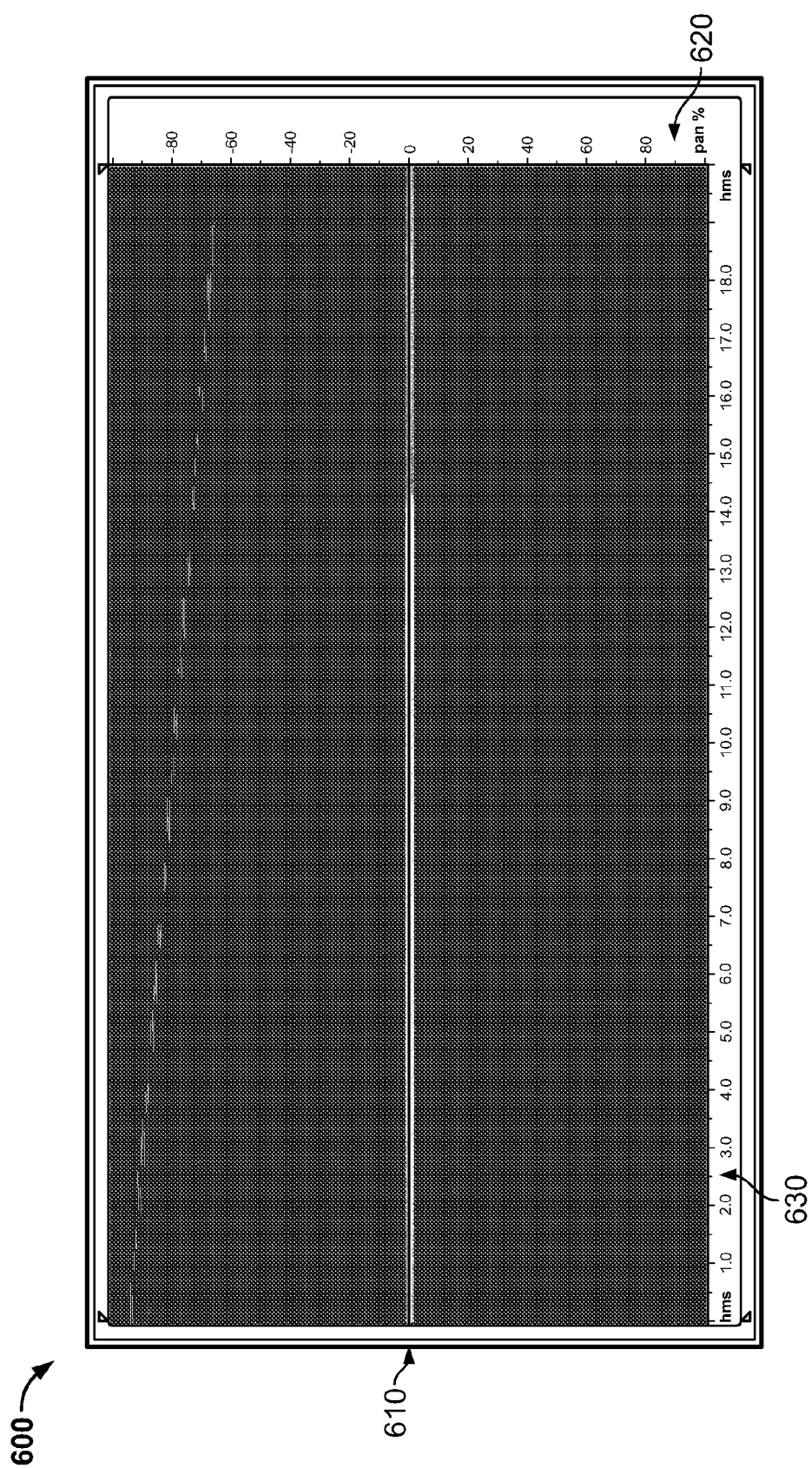
FIG. 6 shows an example pan display of digital audio data.

FIG. 6 shows an example pan display 600 of a digital audio data 610. The pan display 600 shows a representation of the digital audio data 610 with respect to pan on Y-axis 620 and with respect to time on the X axis 630. The digital audio data 610 is displayed as panned to the center. Thus both channels (e.g., left and right), are centered in the stereo field (e.g., both channels are contributing all audio data to the center of the stereo field).

After the system receives the digital audio data and displays a representation of the audio data, the system receives 520 an input (e.g., from a user) specifying values for a pan position to apply to the digital audio data. The pan position can be specified with respect to one or more frequency bands for the digital audio data. After receiving the user input specifying values for a pan position, the system identifies pan position as a function of frequency and generates 530 a representation of the user-defined pan position. The representation of the user-defined pan position can be a curve that can be used to edit a pan position representation of the audio data. In some implementations, the system analyzes the selected portion of the pan position and then applies the results of analyzing the selected portion (e.g., the curve), to other portions of audio data within the same track.

Figure 7:
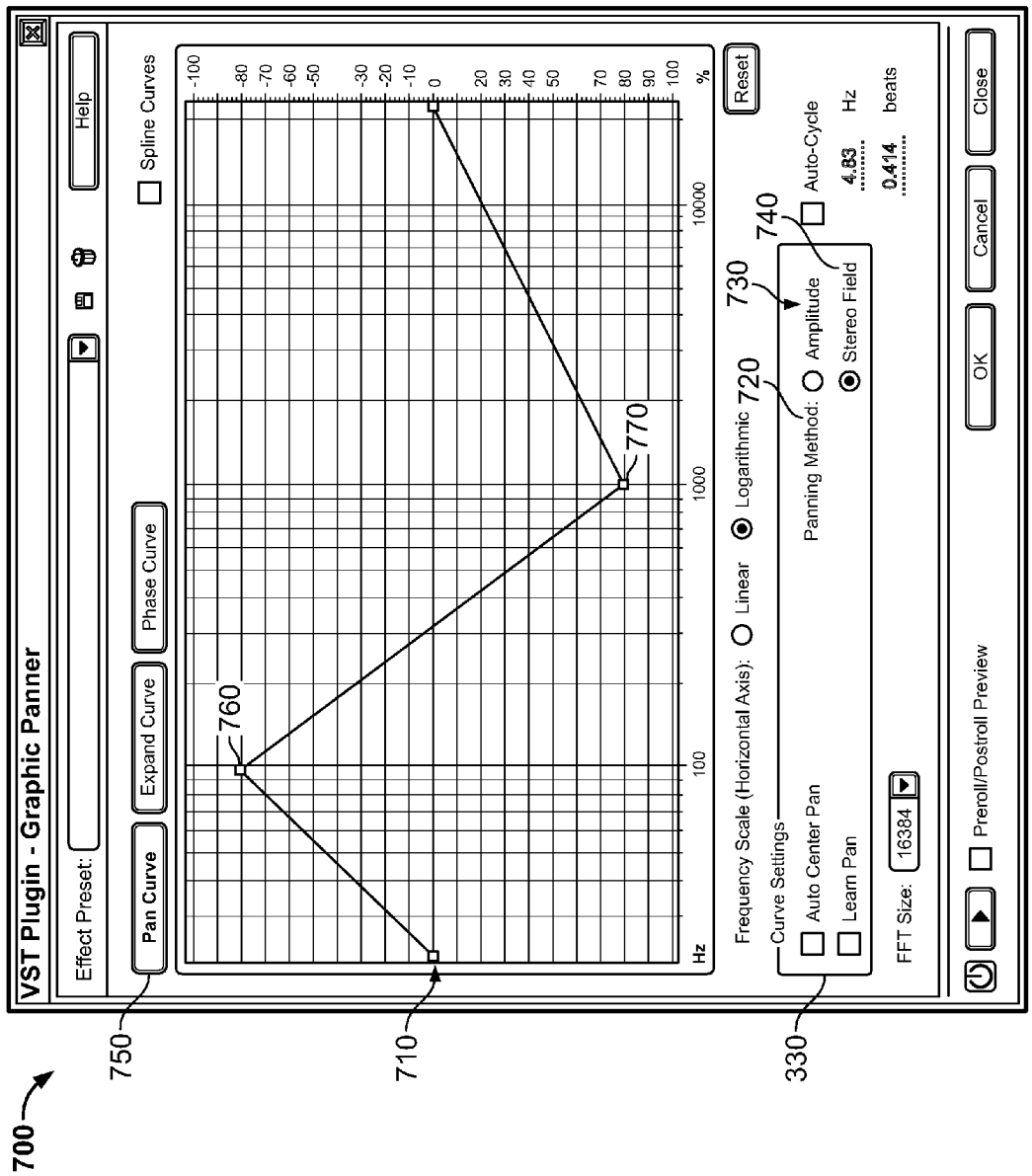
FIG. 7 shows an example user interface display of a user-defined pan curve.

FIG. 7 shows an example user interface display 700 including a user-defined pan curve 710. In FIG. 7, the pan position for the lower frequency of 100 Hz 760 (e.g., a frequency band including 100 Hz) has been moved from center (0-degrees) to the left (−80-degrees). Additionally, the pan position for the higher frequency of 10 kHz 770 has been moved from center (0-degrees) to the right (80-degrees).

In addition to displaying a representation of a user-defined pan curve 710, the user interface 700 can also include representations of the different controls that can be used for applying effects to audio data. For example, the user interface can include a pan curve selection option 750, which facilitates the creation of the user-defined pan curve 710 by providing additional options (e.g., a curve setting specific to the creation of a pan curve). Additionally, the representation of a user-defined pan curve 710 can include one or more control points (e.g., 710, 760, 770) that the user can manipulate to edit the user-defined pan curve 710 and the corresponding underlying audio data. For example, the user-defined pan curve 710 can be manipulated to place control point 760 back to center (0-degrees) and control point 770 slightly right of center (e.g., 20-degrees). This change would cause the lower frequencies (e.g., 100 Hz) to be perceived as more centered and the higher frequencies (e.g., 10 kHz) to sound as though they were slightly more prevalent on the right.

The user interface 700 can also include one or more curve settings 330 (e.g., panning methods 720). In some implementations, the panning methods 720 include an amplitude setting 730 and a stereo field setting 740.

For example, when panning, if the amplitude setting 730 is selected, the system can reduce the amplitude in one channel as it increases the amplitude in the other channel, while keeping the power level the same. Thus, when panning 100% to the left, the amplitude in the left channel is increased 3 dB and the pan in the right channel is reduced to zero, (e.g., any audio that was originally only in the right channel would disappear). No stereo field is preserved when the audio data is panned 100% to either channel, since the opposite channel goes to zero. The stereo field is more compressed the further the audio data is panned in one direction (e.g., left or right). When the audio data is panned 100% in one direction, the result is mono audio data as all stereo field information is removed. If the stereo field setting 740 is selected, the system can preserve the stereo field. For example, when panning 100% left, any audio that was originally in the right channel would be panned to the center, audio that was originally in the center would still be panned left (e.g., according to the indicated adjusted amount), and any audio panned hard left before the adjustment would be panned back to center.

Any combination of controls may be chosen by the user or specified by the system. Additionally, in some implementations, the user modifies one or more default control values. The display of the controls is optional, and selectable. For example, the system (by default or based on a user-selection) can display any control alone or in combination with one or more other controls. Additionally, other controls may be added to the user interface (e.g., imported into the system), to reflect additional optional effects which can be applied to the audio data.

Figure 8:
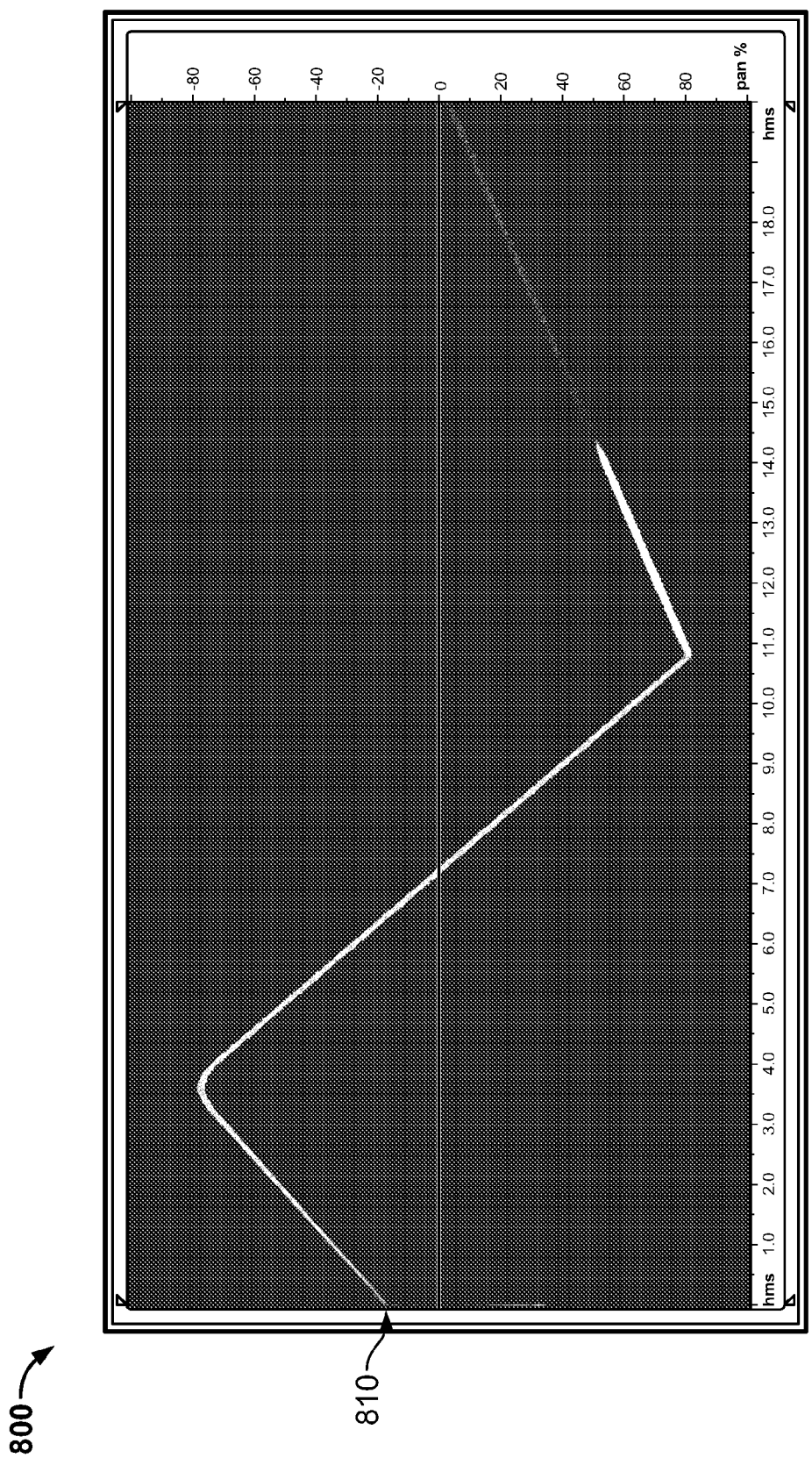
FIG. 8 shows an example pan display following application of the user-defined pan curve of FIG. 7.

In some implementations, the user-defined pan curve 710 is applied 540 to the digital audio data, to form edited digital audio data. FIG. 8 shows an example pan display 800 incorporating the user-defined pan curve 710 creating the adjusted pan curve 810. The application 540 of the user-defined pan curve 710 to the audio data can adjust the feature value for a frequency band by an amount corresponding to the respective user-defined pan curve value. For example, the user-defined pan curve 710 in FIG. 7 shows a view with frequencies (e.g., near 100 Hz) panned left 760 (e.g., −80%), and frequencies (e.g., near 1000 Hz) panned right 770 (e.g., 80%). In FIG. 8, the user-defined pan curve 710 is applied 540 to pan display 600 of digital audio data 610 resulting in an adjusted pan curve 810 (e.g., where most or all of the frequencies closely match the user-defined pan curve). The system can store 550 the edited digital audio data for future use or manipulation. The user can choose to store the original pan curve 610, the adjusted pan curve 810, or both.

The method described above can be implemented in a computing system.

Figure 9:
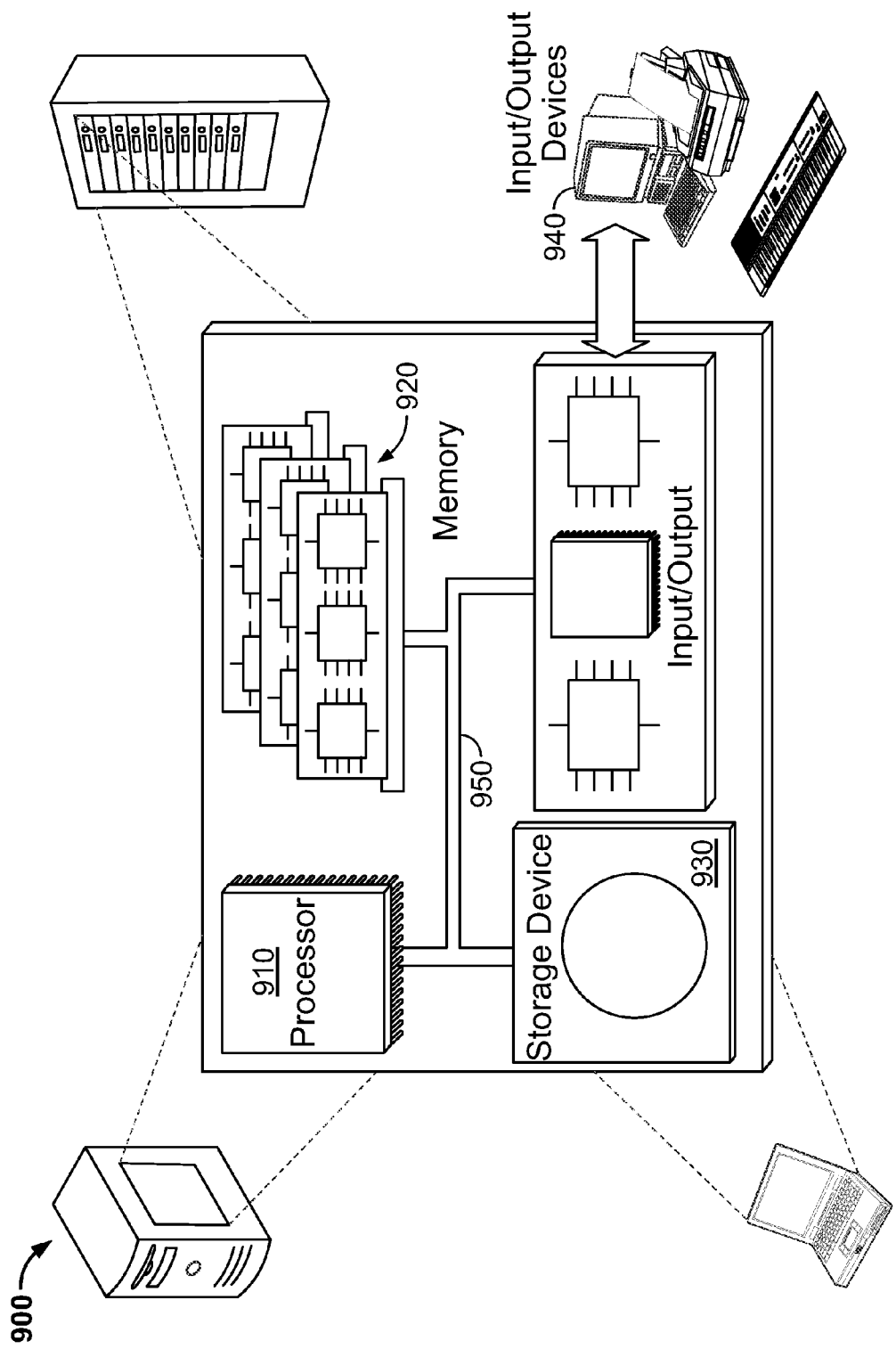
FIG. 9 shows a schematic diagram of an example computer system.

FIG. 9 shows a schematic diagram of an example computer system. FIG. 9 is a schematic diagram of a generic computer system 900. The system 900 can be used for practicing operations described in association with the method 100. The system 900 can include a processor 910, a memory 920, a storage device 930, and input/output devices 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 is a computer readable medium such as volatile or non volatile that stores information within the system 900. The memory 920 can store data structures, for example. The storage device 930 is capable of providing persistent storage for the system 900. The storage device 930 may be a floppy disk device, a hard disk device, an optical disk device, or a tape device, or other suitable persistent storage means. The input/output device 940 provides input/output operations for the system 900. In one implementation, the input/output device 940 includes a keyboard and/or pointing device. In another implementation, the input/output device 940 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    receiving digital audio data that include a plurality of audio channels;
    receiving a selection including a portion of the digital audio data;
    identifying a plurality of frequency bands in the digital audio data;
    calculating a feature value for each frequency band over a specified period of time, wherein the feature value for each frequency band is calculated from the plurality of audio channels, and the feature value for a given frequency band is calculated from audio data corresponding to the given frequency band in the plurality of audio channels; and
    using the feature value for each frequency band to adjust the feature of the audio data.

2. The method of claim 1 where the feature is phase difference or pan position.

3. The method of claim 1, wherein identifying the plurality of frequency bands includes analyzing the feature of the audio data for the selected portion, the feature being analyzed with respect to the plurality of frequency bands, the method further comprising:
generating a representation of the analyzed feature, the representation including the calculated feature value for each frequency band over the specified period of time.

4. The method of claim 3 further comprising:
applying the representation of the analyzed feature to the audio data including constructing a curve that adjusts the feature value for each frequency band by an amount corresponding to the curve value.

5. The method of claim 4 where:
applying the representation of the analyzed feature to the audio data includes re-applying the representation of the analyzed feature to the digital audio data to adjust audio data outlying the curve after the first adjustment.

6. The method of claim 4 where:
applying the representation of the analyzed feature to the audio data includes applying the representation to the selected portion of audio data, a portion of audio data other than the selected portion, or both.

7. A method comprising:
receiving digital audio data that include a plurality of audio channels;
receiving a selection including a portion of the digital audio data;
identifying a plurality of frequency bands in the digital audio data;
dynamically calculating a feature value for each frequency band in the selected portion as the feature value changes such that the calculation of each feature value is based upon the value of that feature at a previous time period, wherein the feature value for each frequency band is calculated from the plurality of audio channels, and the feature value for a given frequency band is calculated from audio data corresponding to the given frequency band in the plurality of audio channels; and
using each feature value to adjust the feature of the audio data.

8. The method of claim 7 where the feature is phase difference or pan position.

9. The method of claim 7, wherein identifying the plurality of frequency bands includes analyzing the feature of the audio data for the selected portion, the feature being analyzed with respect to the plurality of frequency bands, the method further comprising:
generating a representation of the analyzed feature, the representation including each dynamically calculated feature value for each frequency band.

10. The method of claim 9 further comprising:
applying the representation of the analyzed feature to the audio data including constructing a curve that automatically adjusts the feature value for each frequency band by an amount corresponding to the curve value, the adjustment being done as the representation is being generated.

11. The method of claim 10 where:
applying the representation of the analyzed feature to the audio data includes re-applying the representation of the analyzed feature to the digital audio data to adjust audio data outlying the curve after the first adjustment.

12. The method of claim 10 where:
applying the representation of the analyzed feature to the audio data includes applying the representation to the selected portion of audio data, a portion of audio data other than the selected portion, or both.

13. A computer-program product tangibly embodied on a computer readable medium for storing instructions, which when executed by a processor, causes the processor to perform operations comprising:
receiving digital audio data that include a plurality of audio channels;
receiving a selection including a portion of the digital audio data;
identifying a plurality of frequency bands in the digital audio data;
calculating a feature value for each frequency band over a specified period of time, wherein the feature value for each frequency band is calculated from the plurality of audio channels, and the feature value for a given frequency band is calculated from audio data corresponding to the given frequency band in the plurality of audio channels; and
using the feature value for each frequency band to adjust the feature of the audio data.

14. The computer-program product of claim 13 where the feature is phase difference or pan position.

15. The computer-program product of claim 13, where identifying the plurality of frequency bands includes analyzing the feature of the audio data for the selected portion, the feature being analyzed with respect to the plurality of frequency bands, the operations further comprising:
generating a representation of the analyzed feature, the representation including the calculated feature value for each frequency band over the specified period of time.

16. The computer-program product of claim 15, the operations further comprising:
applying the representation of the analyzed feature to the audio data including constructing a curve that adjusts the feature value for each frequency band by an amount corresponding to the curve value.

17. The computer-program product of claim 16 where:
applying the representation of the analyzed feature to the audio data includes re-applying the representation of the analyzed feature to the digital audio data to adjust audio data outlying the curve after the first adjustment.

18. The computer-program product of claim 16 where:
applying the representation of the analyzed feature to the audio data includes applying the representation to the selected portion of audio data, a portion of audio data other than the selected portion, or both.

19. A computer-program product tangibly embodied on a computer readable medium for storing instructions, which when executed by a processor, causes the processor to perform operations comprising:
receiving digital audio data that include a plurality of audio channels;
receiving a selection including a portion of the digital audio data;
identifying a plurality of frequency bands in the digital audio data;
dynamically calculating a feature value for each frequency band in the selected portion as the feature value changes such that the calculation of each feature value is based upon the value of that feature at a previous time period, wherein the feature value for each frequency band is calculated from the plurality of audio channels, and the feature value for a given frequency band is calculated from audio data corresponding to the given frequency band in the plurality of audio channels; and using each feature value to adjust the feature of the audio data.

20. The computer-program product of claim 19 where the feature is phase difference or pan position.

21. The computer-program product of claim 19, where identifying the plurality of frequency bands includes analyzing the feature of the audio data for the selected portion, the feature being analyzed with respect to the plurality of frequency bands, the operations further comprising:

generating a representation of the analyzed feature, the representation including each dynamically calculated feature value for each frequency band.

22. The computer-program product of claim 21, the operations further comprising:

applying the representation of the analyzed feature to the audio data including constructing a curve that automatically adjusts the feature value for each frequency band by an amount corresponding to the curve value, the adjustment being done as the representation is being generated.

23. The computer-program product of claim 22 where:

applying the representation of the analyzed feature to the audio data includes re-applying the representation of the analyzed feature to the digital audio data to adjust audio data outlying the curve after the first adjustment.

24. The computer-program product of claim 22 where:

applying the representation of the analyzed feature to the audio data includes applying the representation to the selected portion of audio data, a portion of audio data other than the selected portion, or both.

25. A system comprising:

a user interface device;

one or more computers operable to interact with the user interface device and a processor; and a memory for storing instructions, which when executed by the processor, causes the processor to perform operations comprising:

receiving digital audio data that include a plurality of audio channels;

receiving a selection including a portion of the digital audio data;

identifying a plurality of frequency bands in the digital audio data;

calculating a feature value for each frequency band over a specified period of time, wherein the feature value for each frequency band is calculated from the plurality of audio channels, and the feature value for a given frequency band is calculated from audio data corresponding to the given frequency band in the plurality of audio channels; and using the feature value for each frequency band to adjust the feature of the audio data.

26. The system of claim 25 where the feature is phase difference or pan position.

27. The system of claim 25, where identifying the plurality of frequency bands includes analyzing the feature of the audio data for the selected portion, the feature being analyzed with respect to the plurality of frequency bands, the operations further comprising:

generating a representation of the analyzed feature, the representation including the calculated feature value for each frequency band over the specified period of time.

28. The system of claim 27 the operations further comprising:

applying the representation of the analyzed feature to the audio data including constructing a curve that adjusts the feature value for each frequency band by an amount corresponding to the curve value.

29. The system of claim 28 where:

applying the representation of the analyzed feature to the audio data includes re-applying the representation of the analyzed feature to the digital audio data to adjust audio data outlying the curve after the first adjustment.

30. The system of claim 28 where:

applying the representation of the analyzed feature to the audio data includes applying the representation to the selected portion of audio data, a portion of audio data other than the selected portion, or both.

31. A system comprising:

a user interface device;

one or more computers operable to interact with the user interface device and a processor; and a memory for storing instructions, which when executed by the processor, causes the processor to perform operations comprising:

receiving digital audio data that include a plurality of audio channels;

receiving a selection including a portion of the digital audio data;

identifying a plurality of frequency bands in the digital audio data;

dynamically calculating a feature value for each frequency band in the selected portion as the feature value changes such that the calculation of each feature value is based upon the value of that feature at a previous time period, wherein the feature value for each frequency band is calculated from the plurality of audio channels, and the feature value for a given frequency band is calculated from audio data corresponding to the given frequency band in the plurality of audio channels; and using each feature value to adjust the feature of the audio data.

32. The system of claim 31 where the feature is phase difference or pan position.

33. The system of claim 31, where identifying the plurality of frequency bands includes analyzing the feature of the audio data for the selected portion, the feature being analyzed with respect to the plurality of frequency bands, the operations further comprising:

generating a representation of the analyzed feature, the representation including each dynamically calculated feature value for each frequency band.

34. The system of claim 33 the operations further comprising:

applying the representation of the analyzed feature to the audio data including constructing a curve that automatically adjusts the feature value for each frequency band by an amount corresponding to the curve value, the adjustment being done as the representation is being generated.

35. The system of claim 34 where:

applying the representation of the analyzed feature to the audio data includes re-applying the representation of the analyzed feature to the digital audio data to adjust audio data outlying the curve after the first adjustment.

36. The system of claim 34 where:

applying the representation of the analyzed feature to the audio data includes applying the representation to the selected portion of audio data, a portion of audio data other than the selected portion, or both.

* * * * *